United States Patent
Bosschaert et al.

(10) Patent No.: US 9,710,370 B2
(45) Date of Patent: Jul. 18, 2017

(54) AUTOMATED TESTING OF SHELL SCRIPTS

(71) Applicant: ADOBE SYSTEMS INCORPORATED, San Jose, CA (US)

(72) Inventors: Allaert Joachim David Bosschaert, Dublin (IE); Carsten Ziegeler, Paderborn (DE); Michael Alexander Marth, Basel (CH)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/882,020

(22) Filed: Oct. 13, 2015

(65) Prior Publication Data

US 2017/0103015 A1    Apr. 13, 2017

(51) Int. Cl.
G06F 9/44    (2006.01)
G06F 11/36   (2006.01)

(52) U.S. Cl.
CPC ................ *G06F 11/3688* (2013.01)

(58) Field of Classification Search
CPC .................................. G06F 11/3688
USPC ....................................... 717/127
See application file for complete search history.

(56) References Cited

U.S. PATENT DOCUMENTS

| 7,171,587 | B2 * | 1/2007 | Hlotyak | G01R 31/31907 |
| | | | | 702/121 |
| 8,037,360 | B2 * | 10/2011 | Rusmanov | G06F 11/3688 |
| | | | | 714/38.1 |
| 2006/0156288 | A1 * | 7/2006 | Jones | G06F 9/547 |
| | | | | 717/124 |

* cited by examiner

*Primary Examiner* — Wei Zhen
*Assistant Examiner* — Lanny Ung
(74) *Attorney, Agent, or Firm* — Shook, Hardy & Bacon, L.L.P.

(57) ABSTRACT

Embodiments of the present invention provide systems, methods, and computer storage media directed at automated testing of shell scripts and core functionality of a software application under test utilizing the same testing environment. In embodiments, a testing environment that is configured to perform automated testing of core functionality of a software application under test is provided with a test library that extends the testing capabilities of the testing environment to also perform automated testing of shell scripts of the software application under test. The core functionality can be encoded in a first programming language, while the shell scripts are encoded in a second programming language. Other embodiments may be described and/or claimed.

18 Claims, 5 Drawing Sheets

AUTOMATED TESTING OF SHELL SCRIPTS

BACKGROUND

Software application testing, such as unit testing, is commonly utilized to improve the quality of the underlying code of a software application. Software application testing, especially unit testing, can also help speed up the development lifecycle by identifying faults in the software application early on in the development life cycle, where problems can be resolved more efficiently than if the faults were identified later on in the development life cycle. In addition, software application testing can increase the overall stability of the software application through testing of an array of various scenarios designed to increase the amount of code that is tested. As such, testing all aspects of a software application before releasing the software application to the end-user is important. Many software testing frameworks provide support for the automated testing of code written to implement the core functionality of a software application. However, these testing frameworks do not provide support for the automated testing of shell scripts that are written in a different programming language than that of the core functionality and generally support the core functionality of the software application.

DETAILED DESCRIPTION

Embodiments of the present invention are described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The phrase "software application testing" refers to the procedures utilized to ensure that a software application functions as intended. Software application testing includes unit testing, regression testing, system testing, etc.

The phrase "unit testing" refers to software application testing that verifies the functionality of individual units of code of a software application down to the smallest functional unit of the software application. Unit testing may also be referred to in the art as component testing.

The phrase "test case" refers to a set of conditions under which a software application, or portion thereof, is tested to confirm that the software application, or portion thereof, performs as intended. A test case can, for example, define variables that are to be passed to the software application, or portion thereof, during execution, as well as the results that are expected to be produced by such execution.

The phrase "test code" refers to code that has been written to execute a software application, or portions thereof, in accordance with various test cases and to verify the results of the executed software application, or portions thereof, against expected results of the executed portions of the software application. These expected results can be defined within the test cases.

A "testing framework" refers to a collection of reusable executable modules that can be utilized by test code to enable the test code to automatically execute the various test cases against a software application being tested (also referred to as an application under test) and to automatically verify the results of this automatic execution. For instance, JUnit is an example of a testing framework for the Java programming language. Testing framework can also referred to in the art as a testing environment.

A "test library" refers to a collection of reusable executable modules that can be integrated with a testing environment to extend existing testing capabilities of the testing environment. Such a test library can take any form that can be suitably integrated with a testing environment. For instance, if the testing environment is a Junit testing environment, then the test library could be a Java class that extends the TestCase class of the JUnit testing environment by providing additional methods that have been configured to accomplish the extended testing capabilities.

The "core functionality" of a software application refers to the functionality of the software application that enables the software application to accomplish the software application's intended purpose. For example, the core functionality of an internet browser application would be that functionality that enables the browsing and navigation of websites.

A "shell script" of a software application refers to code within the software application that provides support for the core functionality of the software application. For example, shell scripts can create user accounts, databases, launch the core functionality, etc.

The term "path" refers to a unique location in a file system.

The phrase "search path" refers to one or more locations within a file system that are to be utilized by a software application to locate executable modules referred to within the code of the software application.

The phrase "environmental variables" refers to named values associated with an environment in which a software application is executed. For example, the previously mentioned, search path is an environmental variable.

As mentioned previously, many software testing frameworks provide support for the automated testing of the core functionality of a software application. The core functionality of a software application can be developed in any number of various programming languages, such as, for example, Java, C++, Visual Basic, etc. Each of these various languages generally has built-in, or third-party, testing framework available to provide support for the automated unit testing of code written in the respective language. For example, the JUnit testing framework provides automated unit testing support for the Java programming language. These testing frameworks can be utilized by test code that is written by a software developer that automatically execute and verify various aspects of the software application in accordance with test cases that the software developer has coded into the test code. As such, the support for unit testing of each of these various languages generally provides for automated testing of the functionality of code written in the associated programming language. This functionality is referred to herein as core functionality.

Many software applications also include shell scripts. These shell scripts are generally not part of the core functionality of the software application, and instead provide support for the core functionality of the software application. For example, shell scripts can create user accounts, databases, launch the core functionality, etc. Such shell scripts are generally not written in the same programming language as that of the core functionality, and, as a result, the testing framework for the core functionality does not provide support for automated testing of these shell scripts. For example, there is no support for testing a bourne-again shell (Bash) script from within Java or C++. In addition, instructions within shell scripts can often invoke other executable components that carry out various peripheral tasks, such as initializing a server platform, for example. In such instances, it may not be desirable to invoke these other executables, even in manually testing these instructions, because the result of invoking the executable could cause undesirable consequences within the computing system on which the test is being run. As a result, such instructions that invoke other executables are generally not tested in a manner that actually invokes an executable at all, and therefore are not fully tested.

In light of the lack of support for automated testing of shell scripts within these testing frameworks, shell scripts are generally not tested with automated testing tools. This lack of automated testing for shell scripts can leave a gaping hole in the test coverage of the software application and can seriously impact the quality of the code within the shell scripts and/or the end user experience associated with the software application.

Embodiments of the invention discussed herein are directed at extending the functionality of existing testing frameworks to enable the automated testing of shell scripts of a software application, alongside the automated testing of the core functionality of the software application. As such, the same testing framework can be utilized to test both the core functionality of the application as well as the shell scripts, even though the core functionality and the shell scripts are in different languages. The extended functionality may take the form of one or more modules that have been incorporated into the testing framework to provide for such extended functionality. For example, the testing framework could be a JUnit testing framework in Java. In such an example, the extended capabilities could be a library that extends the TestCase class of the JUnit testing framework by incorporating additional methods that have been configured to accomplish this automated testing of shell scripts. As such, the extended capabilities would inherit the functionality of the JUnit TestCase class and build upon this functionality to enable the automated testing of shell scripts, while maintaining the existing functionality of the JUnit testing framework for enabling the automated testing of Java.

This automated execution can be the result of test cases, for example, that have been designated by a software developer in test code written to utilize these extended capabilities of the testing framework. In addition, the test code can define expected results of this automated execution that can then be validated against results of the automated execution logged by the testing framework. This is the case, for both the core functionality of the software application and for shell scripts. The automated testing framework can then output this validation to the software developer to enable correctness of the code of the application to be verified regardless of whether the code is written in the same programming language as the core functionality of the software application or the code is written in a language for shell scripts.

In addition, in some cases, the testing framework may be configured with even further extended capabilities. These further extended capabilities can also configure the testing framework to enable automatic generation of test versions of executables that are capable of logging the parameters, or arguments, that are utilized, by instructions within the shell script, to invoke the test version of the executable. This automatic generation could be implemented, for example, within test library that extends the capabilities of the testing framework, discussed above. These modules may be configured, for example, to accept a string as input (e.g., a name of the actual executable) and to generate a test version of the actual executable based on this string. In embodiments, the test version may be configured to log parameters, or arguments, passed to it, to invoke an additional test version of an executable based on parameters, or arguments, passed to it, or to invoke the actual executable and log any output from the actual executable. Each of these scenarios is discussed more extensively below. In some embodiments, execution of such test versions of an executable, also referred to as mock executables or test executables, could be accomplished by changing a search path of the software application to point to a path that includes the test version of the executable file, as opposed to the actual version of the executable file.

Figure 1:
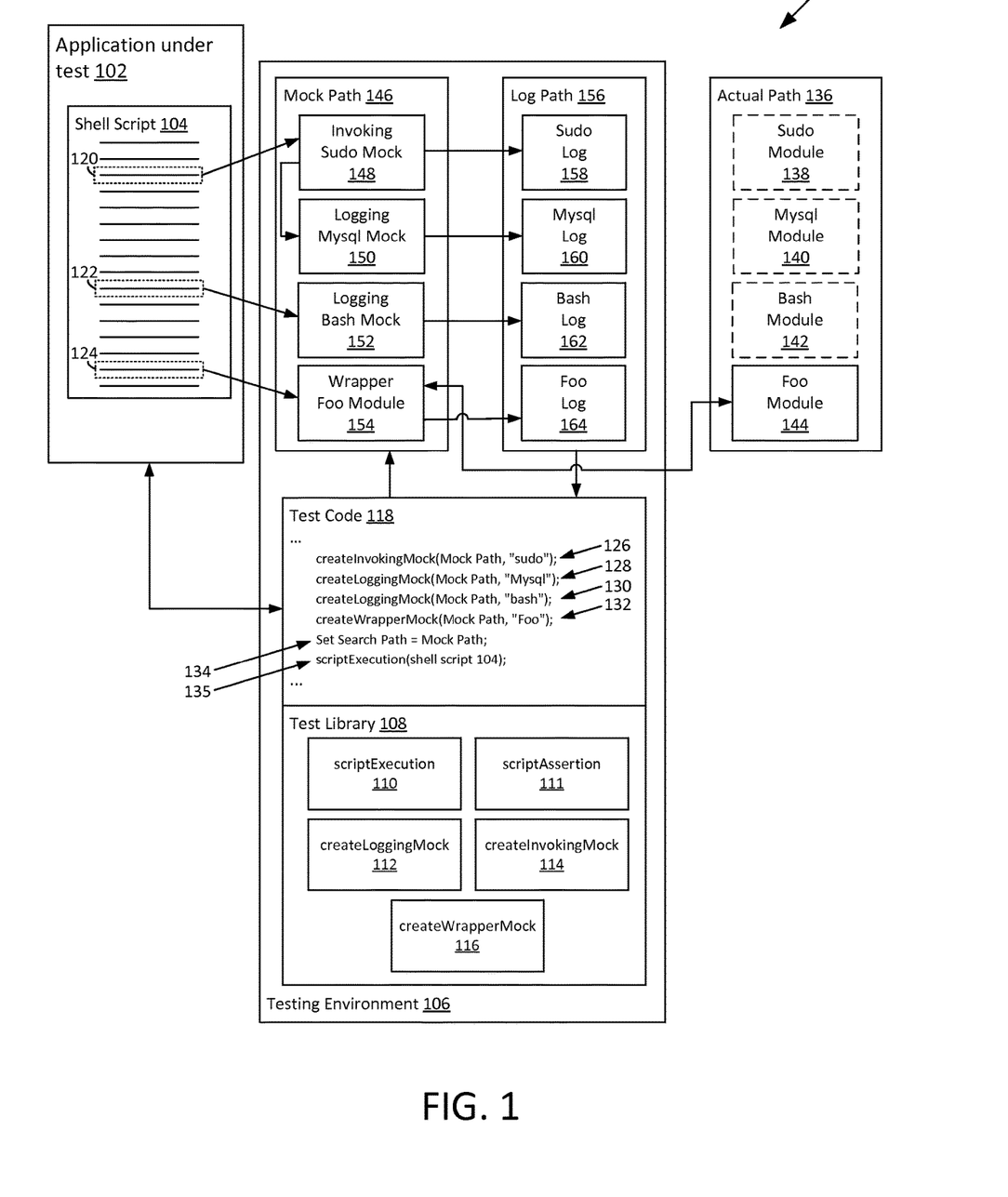
FIG. 1 depicts an illustrative computing environment in which embodiments of the present disclosure may be employed in accordance with various embodiments of the present invention.

FIG. 1 depicts an illustrative computing system 100 in accordance with various embodiments of the present invention. As depicted, computing system 100 includes an application under test 102. The application under test 102 can be any application, or component thereof, that contains application code. Such application code would include instructions that, when executed, are to cause computing system 100 to carry out one or more tasks to implement at least the core functionality of the application under test 102. The core functionality of a software application refers to the functionality of the software application that enables the software application to accomplish the software application's intended purpose. The application code may be written in any programming language such as, for example, Java, C++, Visual Basic, C#, etc.

In embodiments, the application under test 102 also contains shell scripts (e.g., shell script 104). As with the application code discussed above, shell script 104 include instructions that, when executed, are to cause computing system 100 to carry out one or more tasks; however, the instructions contained within shell script 104 are generally written in a different programming language than that of the application code. For example, the instructions of shell script 104 can be written in any of a number of scripting languages depending on the one or more tasks that the instructions are to carry out. In addition, the execution of these shell scripts generally differs from that of the application code. For example, the application code may be written in a programming language that needs to be compiled by a compiler prior to being executable, whereas shell scripts may not undergo any compilation and may instead be executed by an interpreter (e.g., a command line interpreter (CLI)). While the application code is utilized to implement at least the core functionality of the application under test 102, the shell scripts are utilized to, among other things, configure aspects of computing system 100 to enable the core functionality of the application under test 102 to function properly. For example, the instructions contained within shell script 104 can be configured to perform, or cause to be performed, various initialization tasks that need to be carried out prior to execution of the application under test 102, or any component thereof, or to launch various pieces of functionality, including the core functionality, that are part of the application under test 102.

Computing system 100 also includes a testing environment 106. Testing environment 106 could be any suitable testing environment such as, for example, a JUnit testing environment, or any other type of xUnit or other testing environment. These xUnit testing environments are known in the art and therefore will not be discussed in greater detail herein. As depicted, testing environment 106 includes a test library 108. Test library 108 is configured to enable automated testing of any number of various components of the application under test 102. As used herein, a component of an application can include any subset of executable instructions down to the smallest functional units of the application. This type of application testing is commonly referred to in the art as unit testing; however, it will be appreciated that the concepts discussed herein is applicable to other types of testing, including integration testing, regression testing and/or system testing. In embodiments of the present invention this would include automated testing of any application code as well as any shell scripts (e.g., shell script 104) contained within the application under test 102.

To accomplish the automated testing of shell script 104, as well as the application code of the application under test 102, test library 108 is configured to extend the capabilities of testing environment 106. As an example, testing environment 106, when implemented in a Java context, would include the functionality of the JUnit testing framework to accomplish the automated testing of the application code. In such an example, test library 108 could extend, for example, the TestCase class that is part of the JUnit testing framework. As such, test library 108 would inherit the functionality of the JUnit TestCase class and build upon this functionality to enable the automated testing of shell script 104. To implement these extended capabilities, test library 108 can include any number of various modules. Examples of such modules are depicted by scriptExecution module 110, scriptAssertion module 111, createLoggingMock module 112, createInvokingMock module 114, and createWrapperMock module 116. Each of these example modules will be discussed in turn. In other embodiments, it will be appreciated that these extended capabilities could be included in a stand-alone library that forms its own testing environment, rather than extending a testing environment.

The scriptExecution module 110, in some embodiments, is configured to enable the testing environment 106 to provide support for automated execution of shell script 104. For example, in some embodiments, scriptExecution module 110 could represent a scriptExecution method that accepts a string as input. This string can designate a name, or path, of the shell script 104 that could be utilized by the scriptExecution module 110 to initiate the execution of the shell script 104 by communicating, initializing, or otherwise passing, the shell script to an interpreter that is to execute the shell script.

The scriptAssertion module 111, in some embodiments, is configured to enable the testing environment 106 to provide support for automated validation of the results of the execution of shell script 104. In embodiments, this automated validation may be accomplished by configuring scriptAssertion module 111 to compare actual results of the execution of shell script 104 against expected results of the execution of shell script 104. For example, in some embodiments, scriptAssertion module 111 could include one or more methods that accept an argument that designates an expected result of the execution of shell script 104. The scriptAssertion module 111 can then be configured to compare this argument, or validation parameter, against the actual results of the execution. It will be appreciated that, in some embodiments, the validation functionality of testing environment 106 would be sufficient to accomplish this automated validation. For example, in instances where the JUnit testing framework is utilized, the Assert class, of the JUnit testing framework, may provide sufficient functionality for the automated validation. In such embodiments, scriptAssertion module 111 can be omitted. In other embodiments, scriptAssertion module 111 would extend the validation functionality of the testing environment. For example, in instances where the JUnit testing framework is utilized, the scriptAssertion module 111 would extend the Assert class of the JUnit testing framework.

The createLoggingMock module 112 is configured to produce a test version of an executable module that is to be invoked by a shell script. For example, in some embodiments, createLoggingMock module 112 could represent a method that accepts a string as input. This string can designate a name of the executable module that is to be invoked by the shell script. In such an embodiment, the name designated by the input string can be utilized by the createLoggingMock module 112 to generate a test version of the executable module that is named in accordance with the input string. The test version of the executable module can be generated in any programming language, including, for example, a scripting language. In embodiments, createLoggingMock module 112 may be further configured to generate a log file in which to log, or store, results of the execution of the test version of the executable module or any other data items that could provide context for the execution of the test version of the executable module. These data items may include, for example, execution parameters that are passed to the test version of the executable module that are necessary for the executable module to properly perform the intended functionality of the executable module. Examples of these execution parameters are discussed in greater detail below. In some embodiments, createLoggingMock module 112 can be configured to generate the test version of the executable module to a location different from that of the actual executable module. For example, if the actual executable module is located at path 'X,' the test version of the executable module could be generated to a path of 'X\mock.' In some embodiments, createLoggingMock module 112 could be configured to accept another string as input that indicates a path at which the actual executable module is located, or that indicates a path at which the test version of the executable is to be stored. In such embodiments, createLoggingMock module 112 generates the test version of the executable to the indicated path, or to another location based on the indicated path. Such a test version of the executable module would be beneficial in instances where, for example, it is not desirable to invoke the actual executable module, but it would be beneficial to validate the parameters, or arguments, that were constructed by the shell script to invoke the actual executable module.

The createInvokingMock module 114 is also be configured to produce a test version of an executable module that is to be invoked by a shell script. This may be accomplished in a similar manner to that discussed above in reference to the createLoggingMock module 112, however, createInvokingMock module 114 can be configured to generate a test version of the executable module that not only logs results of the execution of the test version of the executable module to a log file, but also invokes a test version of a next executable module that is identified within the parameters, or arguments, passed to the test version of the executable module. Examples of such parameters are discussed in greater detail below. Such a test version of the executable module would be beneficial in instances where, for example, it is not desirable to invoke the actual executable module; however, the parameters utilized to invoke the actual executable module are to also invoke another executable module that itself may or may not be desirable to invoke.

The createWrapperMock module 116 is also be configured to produce a test version of an executable module that is to be invoked by a shell script. This may be accomplished in a similar manner to that discussed above in reference to the createLoggingMock module 112, however, createWrapperMock module 116 can be configured to generate a test version of the executable module that not only logs results of the execution of the test version of the executable module to a log file, but also invokes the actual executable module in accordance with the parameters passed to the test version of the executable module. As such, a test version of the executable module generated using the createWrapperMock module 116 would essentially be a middleman between the shell script and the actual executable module. In addition to logging the parameters passed to the test version of the executable module, a test version of an executable module generated utilizing the createWrapperMock module 116 may also be configured to log results of the execution of the actual executable module. Such a test version of the executable module may be beneficial in instances where, for example, it is desirable to invoke the actual executable module; however, the parameters utilized to invoke the actual executable module and/or the results of the execution of the actual executable module are of interest to one or more test cases that the software developer is seeking to verify.

Testing environment 106 also includes test code 118. Test code 118 can include instructions that are configured to carry out the automated testing of the application under test 102, or any components thereof. One way to accomplish this, would be to include instructions within test code 118 that cause the application under test, or the components thereof that are being tested, to be automatically executed in accordance with execution parameters specified within the test code 118. As used in this context, an execution parameter represents a variable that is utilized as input to the application under test 102, or any components thereof. Parameters may also be referred to herein as arguments. The execution parameters can be selected in accordance with one or more test cases that have been designed, for example, to increase the testing coverage of the application under test 102.

In some embodiments, test code 118 utilizes the extended capabilities provided by test library 108 to perform automated testing of shell script 104, or any other shell scripts that are included within the application under test 102. For example, test code 118 could utilize the scriptExecution module 110 to automatically execute shell script 104 and could also utilize scriptAssertion module 111 to validate the results of the execution of shell script 104.

As mentioned previously, in some embodiments, shell script 104 includes instructions that are to invoke other executable modules that carry out various peripheral tasks; however, in some instances, it may not be desirable to invoke these other executable modules during the testing of shell script 104. Examples of instructions that are to invoke these other executable modules are represented by instructions 120-124 of shell script 104. While the depiction represented by FIG. 1 depicts each of these instructions invoking a respective test version of the illustrative executable modules, it should be readily understood that, absent testing environment 106, these instructions would invoke the actual executable modules 138-144 located at actual path 136. For example, absent testing environment 106, instruction 120 would invoke sudo module 138, instruction 122 would invoke bash module 142, and instruction 124 would invoke foo module 144.

In some embodiments, to prevent the execution of some of these actual executable modules while still enabling the validation of various aspects of the invocation of the executable modules by the shell script 104 (e.g., validation of the parameters utilized to invoke these executable modules or validation of environmental variables of the computing system 100), test code 108 may utilize the extended capabilities provided by test library 108. For example, test code 118 can additionally include instructions (e.g., instructions 126-130) that utilize the createLoggingMock module 112 or the createInvokingMock module 114 to generate test versions of the above mentioned actual executables. Additionally, in instances where execution of the actual executable module is desirable, or at least not detrimental to computing system 100, but validation of the parameters that are utilized to invoke the actual executable and/or validation of the execution of the actual executable is desired, test code 118 may include instructions (e.g., instruction 132) that utilize the createWrapperMock module 116 to generate test versions of any such executable modules.

As can be seen, each of instructions 126-132 includes parameters within the parentheses that are passed to the respectively utilized module of test library 108. For example, as depicted, the first parameter in each instruction (e.g., "Mock Path") indicates a path at which the generated test executable is to reside. The second parameter (e.g., "sudo," Mysql," "bash," and "Foo") each indicate a name of the respective executable module that is to be utilized in generating the test version. As such, instruction 126 generates the invoking sudo mock module 148 in mock path 146, instruction 128 generates the logging mysql mock module 150 in mock path 146, instruction 130 generates the logging bash mock module 152 in mock path 146, and instruction 132 generates the wrapper foo module 154 in mock path 146. It will be appreciated that, while each of these modules are depicted by a different name from the actual executable modules, the names of the test versions of the executable modules would generally be the same as those of the executable modules themselves. In such instances, by keeping the names the same between the two, it would prevent the need to modify the names of the executable modules within shell script 104 to execute a test of shell script 104. The name differences depicted in FIG. 1 are merely utilized for the sake of clarity to simplify the description of the individual module and to prevent any ambiguity as to which module is being referred to.

In addition, as mentioned previously, in some embodiments, the createLoggingMock module 112, the createInvokingMock module 114, and the createWrapperMock module 116 can each be configured to generate a log file associated with the respective test versions of executable modules. Such a log file would store, or log, data concerning parameters passed to the test versions of the executable modules, environment variables of computing system 100, or, in the case of foo log 164, the results of the execution of the actual foo module 144, among other data items. Examples of these log files are depicted by sudo log 158, mysql log 160, bash log 162, and foo log 164 located at log path 156. The data stored in these log files may be utilized to subsequently automatically validate the execution of instructions 120-124. In some embodiments, log path 156 is the same path as mock path 146. In other embodiments, log path 156 is a sub path (e.g., subfolder) of mock path 146. In still other embodiments, log path 156 is completely distinct from mock path 146.

Generating the test versions of the executable modules to be invoked by shell script 104 may only be a first phase to enabling execution of the test versions of the executable module in place of the actual executable modules. In some embodiments, shell script 108 may still search the actual path 136 for the actual executables, so long as a search path of application under test 102, or computing system 100, indicates that the executable modules are contained within actual path 136. In such embodiments, it may be necessary to change the search path so that it is directed towards mock path 146. In some embodiments, this is accomplished through addition of an instruction (e.g., instruction 134) inserted into test code 118. In additional embodiments, this is accomplished via addition of a similar instruction inserted into scriptExecution module 110. In embodiments where such an instruction is inserted into scriptExecution module 110, scriptExecution module 110 can be configured to accept a Boolean variable as input that indicates whether it is desirable to change the search path from actual path 136 to mock path 146. This would enable the selective switching of the search path from within scriptExecution module 110. In such an embodiment, instruction 134 may be omitted from test code 118, and instruction 135 could be replaced with "scriptExecution(true, shell script 104)" to indicate that the search path is to be changed from actual path 136 to mock path 146.

Test code 118 may be written by a software developer that is tasked with testing the application under test 102, or any components thereof. In some embodiments, this software developer can be the same software developer that coded the application under test 102, or the components thereof that are being tested. This may be particularly the case in a unit testing scenario. In addition, test code 118 may be written in any suitable programming language, including the same programming language as that of the core functionality of the application under test 102. As such, in some embodiments of the present invention, the test code 118 that is utilized to automatically test shell script 104 is in a different language than that of shell script 104. For example, if the core functionality of the application is written in Java then the test cases can be implemented in test code that is written for the JUnit testing framework. As such, the test code would also be written in Java, the same language as the core functionality. The shell scripts on the other hand, could, for example, be implemented in a Bash language for Unix shell. As such, in this example, the shell script written in Bash would be tested utilizing test code written in Java for the JUnit testing framework.

Once execution of shell script 104 is initiated by instruction 135, the individual instructions of shell script 104 may begin to be executed. One way to accomplish this is through, for instance, an interpreter, such as, for example, a command line interpreter associated with the scripting language that is utilized to implement, or execute, shell script 104. In embodiments, to accomplish this, scriptExecution module 110 can be configured to initiate the execution of the shell script 104 by the command line interpreter by communicating, initializing, or otherwise passing, the shell script to the command line interpreter.

As shell script 104 is executed, in embodiments where the search path has been set to mock path 146, each of instructions 120-124 would invoke the test versions of the executables located at mock path 146 that were generated by instructions 126-132 of test code 118. It will be appreciated that, while only three instructions are indicated within the shell script 104 as invoking an executable module, there are four test versions of executable modules that were generated via instructions 126-132 of test code 118. This is meant to illustrate one instruction (e.g., instruction 120) within shell script 104 that is to invoke a first executable module (e.g., sudo module 138), which is in turn to invoke a second executable module (mysql module 140). As an illustrative example, instruction 120 could be formatted as "sudo mysql -e create database my_db," where the "sudo" portion of the instruction invokes invoking sudo mock module 148 which is configured to enable the "mysql -e create database my_db" portion of the instruction to invoke logging mysql mock module 150 utilizing super user privileges. This flow of execution is depicted by the arrows within FIG. 1. In addition, each of the invoking sudo mock module 148 and the logging mysql mock module 150 may be configured to log results of the execution of the respective modules into sudo log 158 and mysql log 160.

As mentioned previously, the results of the execution of the respective test version modules can include parameters passed to the individual test version modules. In embodiments, each of these test version modules can log various data items into the respective log files. Returning to the example above, for instance, invoking sudo mock may log the parameter "mysql -e create database my_db" into sudo log 158 for later validation of these parameters against validation parameters defined within the test code that indicate an expected parameter. In addition logging mysql mock 150 may log "-e create database my_db" for later validation of these parameters utilizing, for example, scriptAssertion module 111 in combination with validation parameters defined within the test code. In addition, these test versions may also log values for environmental variables of computing system 100 or application under test 102 at the time the test versions are executed for later validation of these environmental variables again utilizing, for example, scriptAssertion module 111.

Instruction 122, as depicted, when executed causes logging bash mock 152 to be executed, as indicated by the flow of the arrows depicted in FIG. 1. Because logging bash mock 152 was generated utilizing createLoggingMock 112, the execution of logging bash mock 152 may merely log the above discussed data items (e.g., parameters, environmental variables, etc.) into bash log 162 for later validation of these data items utilizing, for example, scriptAssertion module 111 in conjunction with validation parameters within the test code that define expected values for these data items.

Instruction 124, on the other hand, when executed, causes wrapper foo module 154 to be executed, as indicated by the flow of the arrows depicted in FIG. 1. Because wrapper foo module 154 was generated by instruction 132 utilizing createWrapperMock 116, the execution of wrapper foo module 154 causes the actual foo module 144 at actual path 136 to be executed. In addition, wrapper foo module 154 may log the above discussed data items (e.g., parameters, environmental variables, etc.), in addition to any results of the execution of foo module 144, into foo log 164 for later validation of these data items utilizing, for example, scriptAssertion module 111 in conjunction with validation parameters defined in the test code.

Because the execution of instructions 120-122 does not lead to the execution of the actual executable modules referenced within these instructions, it will be appreciated that the actual executable modules that are to be invoked by instructions 120-122 need not necessarily be present on computing system 100. This is depicted in FIG. 1, by the dashed line surrounding these actual executable modules 138-142. This may be beneficial, for example, by enabling performance of tests on shell script 104 even when the actual executable modules have yet to be developed or installed onto computing system 100.

It will be appreciated by those of ordinary skill in the art, that the configuration of computing system 100 has been selected for purposes of illustration only and should not be viewed as limiting of this disclosure. Modules 110-116, discussed above, are selected to present example modules and are depicted as separate modules for purposes of discussion. It will be appreciated that the above discussed functionality could be divided among more, or fewer, modules and that some of the functionality described above could be omitted or added to, without departing from the scope of this disclosure. In addition, the instructions 126-135 and the test versions of the executable modules that are generated from these instructions are meant to merely be examples of possible test versions. There are a multitude of other configurations that can be implemented without departing from the scope of this disclosure and each of these other configurations are expressly contemplated herein.

Figure 2:
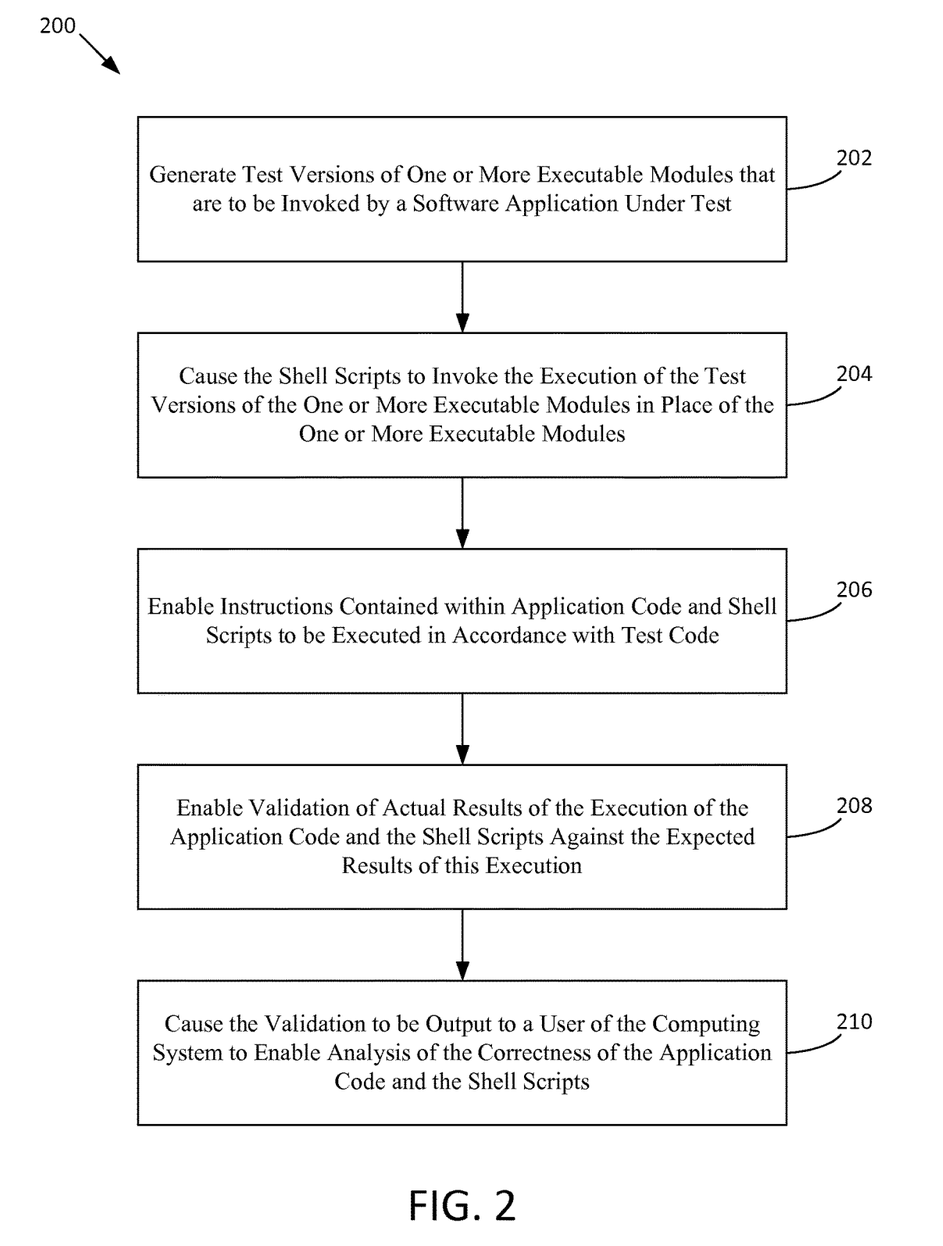
FIG. 2 depicts a process flow showing an illustrative method for testing a software application, or components thereof, in accordance with various embodiments of the present disclosure.

FIG. 2 depicts an illustrative process flow 200 showing a method for testing both application code and shell scripts of a software application, in accordance with various embodiments of the present disclosure. This may be accomplished utilizing testing environment 106 of FIG. 1. The process flow may begin at block 202 where test versions of one or more executable modules that are to be invoked by the software application, or invoked by the components of the software application that are being tested, are generated by a testing environment (e.g., testing environment 106 of FIG. 1). These test versions of the one or more executable modules may be generated in accordance with test code that defines parameters for testing the software application or the components thereof, including shell scripts, that are being tested. Such a generation of test versions of executable modules is discussed extensively with respect to FIG. 1. It will be appreciated that, in some embodiments, the software application may invoke no such executable modules. In such embodiments, block 202 may be omitted.

At block 204, the testing environment causes the test versions of the one or more modules to be executed in place of the one or more executable modules themselves. In embodiments, this may be accomplished by changing the search path associated with the execution of the software application under test. Such a change of the search path would be accomplished in a same or similar manner to that discussed in detail above, in reference to FIG. 1

Process flow 200 continues to block 206 where instructions contained within application code and shell scripts may be executed in accordance with the test code. In embodiments, this test code may be written in the same programming language as that of the application code of the application under test. As such, in embodiments of the present invention, this test code, that can be utilized to automatically test shell scripts that are included within the application under test, is in a different language than that of the shell scripts. For example, if the core functionality of the application is written in Java then the test cases can be implemented in test code that is written for the JUnit testing framework. As such, the test code would also be written in Java, the same language as the core functionality. The shell scripts on the other hand, could, for example, be implemented in a Bash language for Unix shell. As such, in this example, the shell script written in Bash would be tested utilizing test code written in Java for the JUnit testing framework. It will be appreciated that the execution of the application code and the shell scripts can occur concurrently or at temporally separate time periods. For example, the testing environment can enable the execution of both application code and shell scripts that are to be executed in accordance with test code; however, the application code may be executed at a separate time from the execution of the shell scripts depending upon the test code. Execution of shell scripts may be accomplished in a similar manner to that described above in reference to FIG. 1 (e.g., utilizing the scriptExecution module 110).

At block 208 the testing environment may enable validation of actual results of the execution of the application code and the execution of the shell scripts against expected results of this execution that, at least in some embodiments, are defined within the test code. It will be appreciated that such validation can occur concurrently or at temporally separate time periods. For example, the testing environment may enable the execution of both application code and shell scripts that are to be executed in accordance with test code; however, the application code can be executed at a separate time from the execution of the shell scripts depending upon the test code. Validation of the shell scripts may be accomplished in a similar manner to that described above in reference to FIG. 1 (e.g., utilizing the scriptAssertion module 111). Finally, at block 210 the testing environment may cause the validation to be output to a user of the testing environment. This may enable analysis of the correctness of the application code and the shell scripts.

Figure 3:
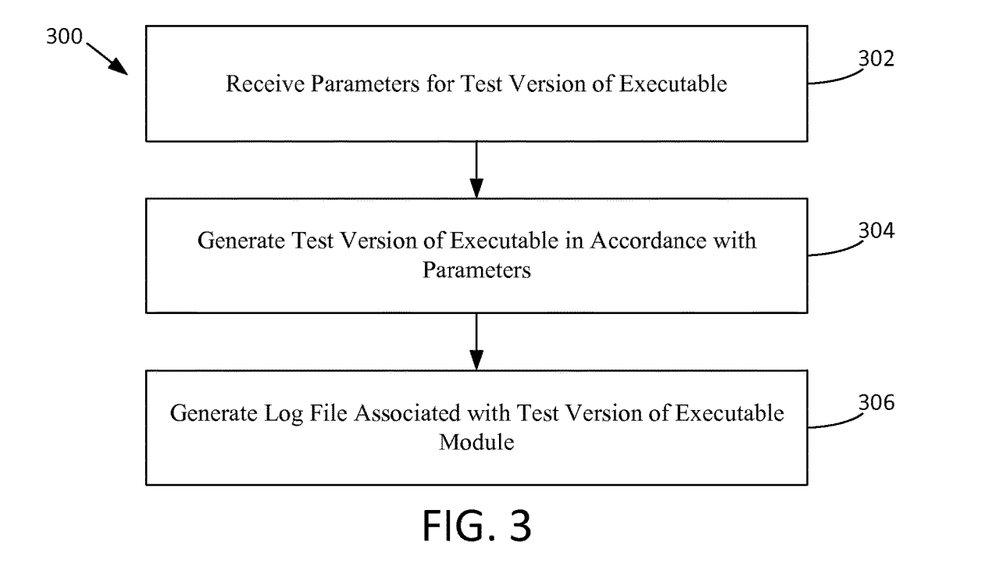
FIG. 3 depicts an illustrative process flow showing a method for generating a test version of an executable module in accordance with various embodiments of the present disclosure.

FIG. 3 depicts an illustrative process flow 300 showing a method for generating a test version of an executable module in accordance with various embodiments of the present disclosure. Process flow 300 can be carried out by any one of the createLoggingMock module 112, createInvokingMock module 114, or the createWrapperMock module 116, discussed above in reference to FIG. 1, in accordance with test code written to utilize any one of these modules. At block 302 parameters for the test version of the executable module are received. These parameters would be defined within test code (e.g., test code 118 of FIG. 1). These parameters could include, for example, a mock path identifier that indicates a path at which the generated test executable is to reside and a name to utilize in creating the test executable.

At block 304, a test executable is generated in accordance with the received parameters. For instance, where a mock path identifier is included in the parameters, the mock path identifier can be utilized to determine a location at which the test executable is to be generated. Such a mock path is depicted in FIG. 1 by mock path 146. In addition, the name included in the parameters can be utilized as the name of the test executable. It will be appreciated that the name of the test executable would generally be the same as that of the actual executable itself, because keeping the name of the test executable the same as the actual executable prevents the need to modify the names within the shell script. As such, only the search path would need to be modified (as demonstrated by instruction 134 of FIG. 1).

At block 306, a log file associated with the generated test executable is created. Such a log file would store, or log, data concerning parameters passed to the test executable; environment variables of the computing system during execution of the test executable; the results of the execution of the actual module; or any other suitable data items. Examples of such a log file are depicted by sudo log 158, mysql log 160, bash log 162, and foo log 164 of FIG. 1. The data stored in these log files may be utilized to subsequently automatically validate the execution of the shell script.

Figure 4:
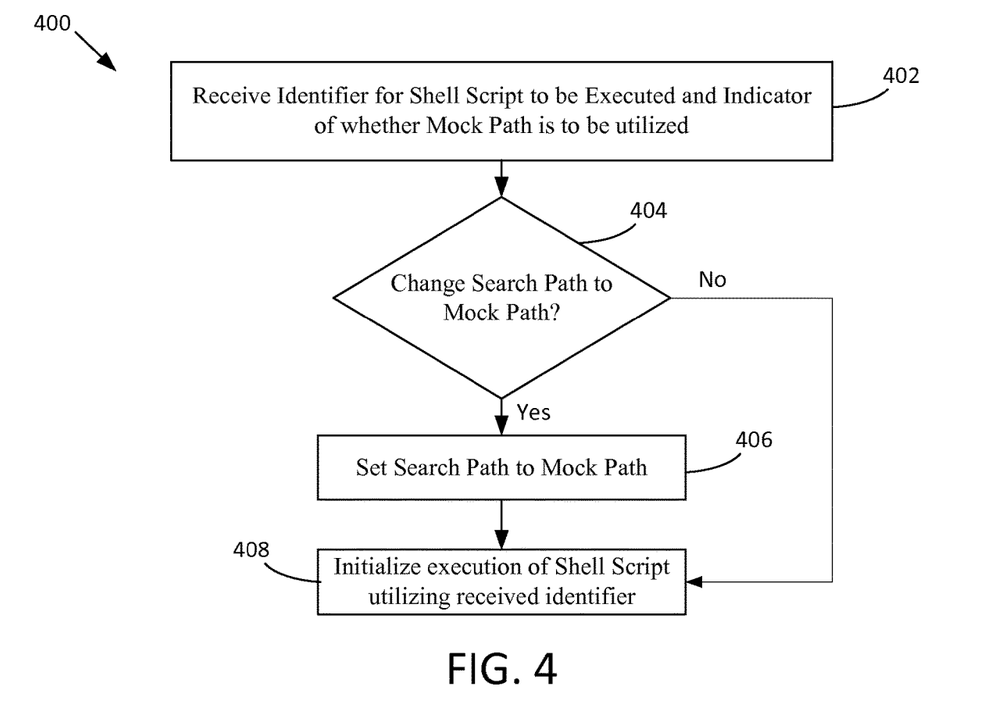
FIG. 4 depicts a process flow for causing a shell script to be executed, in accordance with various embodiments of the present disclosure.

FIG. 4 depicts a process flow 400 for causing a shell script to be executed, in accordance with various embodiments of the present disclosure. Process flow 400 can be carried out, for example, by scriptExecution module 110, discussed above in reference to FIG. 1, in accordance with test code written to utilize the scriptExecution module. At block 402, an identifier for a shell script that is to be executed is received. This identifier could take the form of a string input that designates a name and/or path of the shell script to be executed. In addition, at block 402 an indicator is received that designates whether a mock path (e.g., mock path 146 of FIG. 1) is to be utilized to enable test versions of executables to be executed in place of actual versions of the executables. Such an indicator could be, for example, a Boolean value, where, for example, a value of true indicates that the mock path is to be used and false indicates that the actual path is to be used.

At block 404 a determination is made as to whether to change the search path of the system to the mock path. In the depicted embodiment, this determination would be based on the indicator received at block 402. If the result of block 404 is in the affirmative, then the process flow continues to block 406 where the search path is set to equal the mock path, such that test versions of executables residing at the mock path would be executed by the identified shell script rather than the actual executables. The processing then continues to block 408 where the execution of the identified shell script is initialized. If the result of block 404 is in the negative, then the process flow continues to block 508 where the execution of the identified shell script is initialized.

At block 408, the execution of the identified shell script is initialized. This could be accomplished, for example, by initializing a command line interpreter, and passing either the identifier, or the identified shell script itself, to the command line interpreter for execution.

Figure 5:
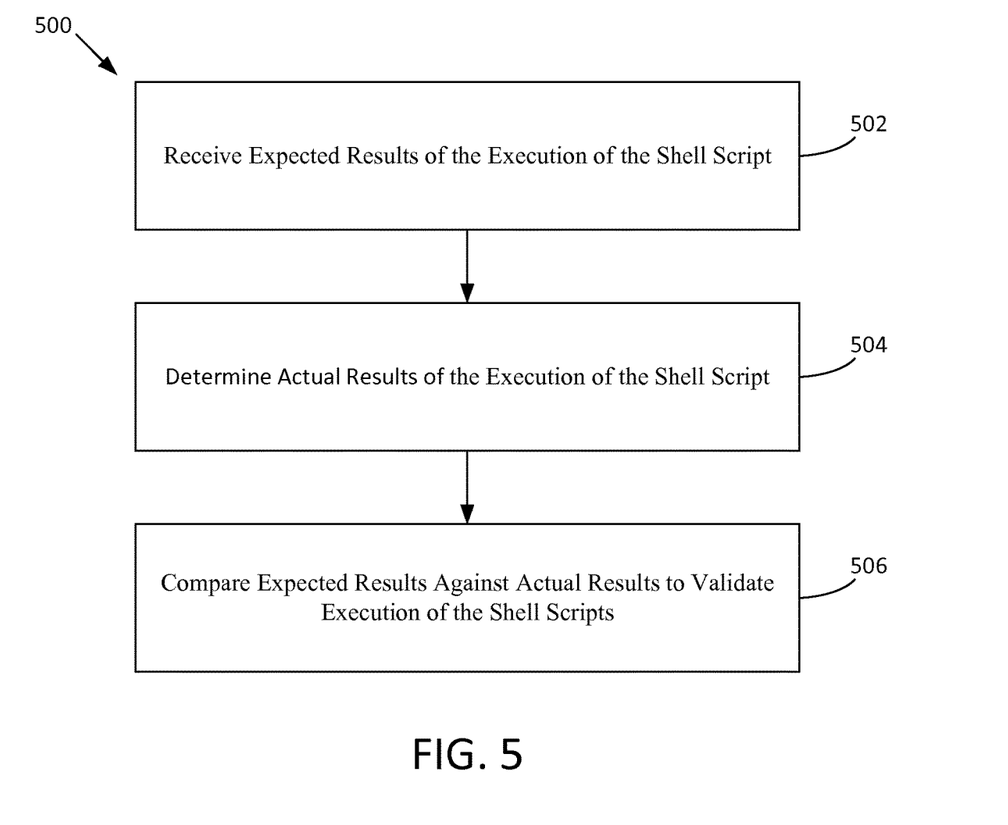
FIG. 5 depicts a process flow for verifying the results of the execution of a shell script, in accordance with various embodiments of the present disclosure.

FIG. 5 depicts a process flow 500 for verifying the results of the execution of a shell script, in accordance with various embodiments of the present disclosure. Process flow 600 can be carried out, for example, by scriptAssertion module 111, discussed above in reference to FIG. 1, in accordance with test code written to utilize the scriptAssertion module. The process flow begins at block 502 where an expected result of the execution of a shell script is received. At block 504 an actual result of the execution of the shell script is determined, this could be accomplished utilizing, for example, process flow 600, discussed above, to carry out the execution of the shell script. At block 506 the expected results received at block 502 and the actual results determined at block 504 are compared to validate the execution of the shell script and determined whether the shell script is performing as expected. The results of this validation could be output to a user to enable the user to analyze the correctness of the code contained within the shell script.

Figure 6:
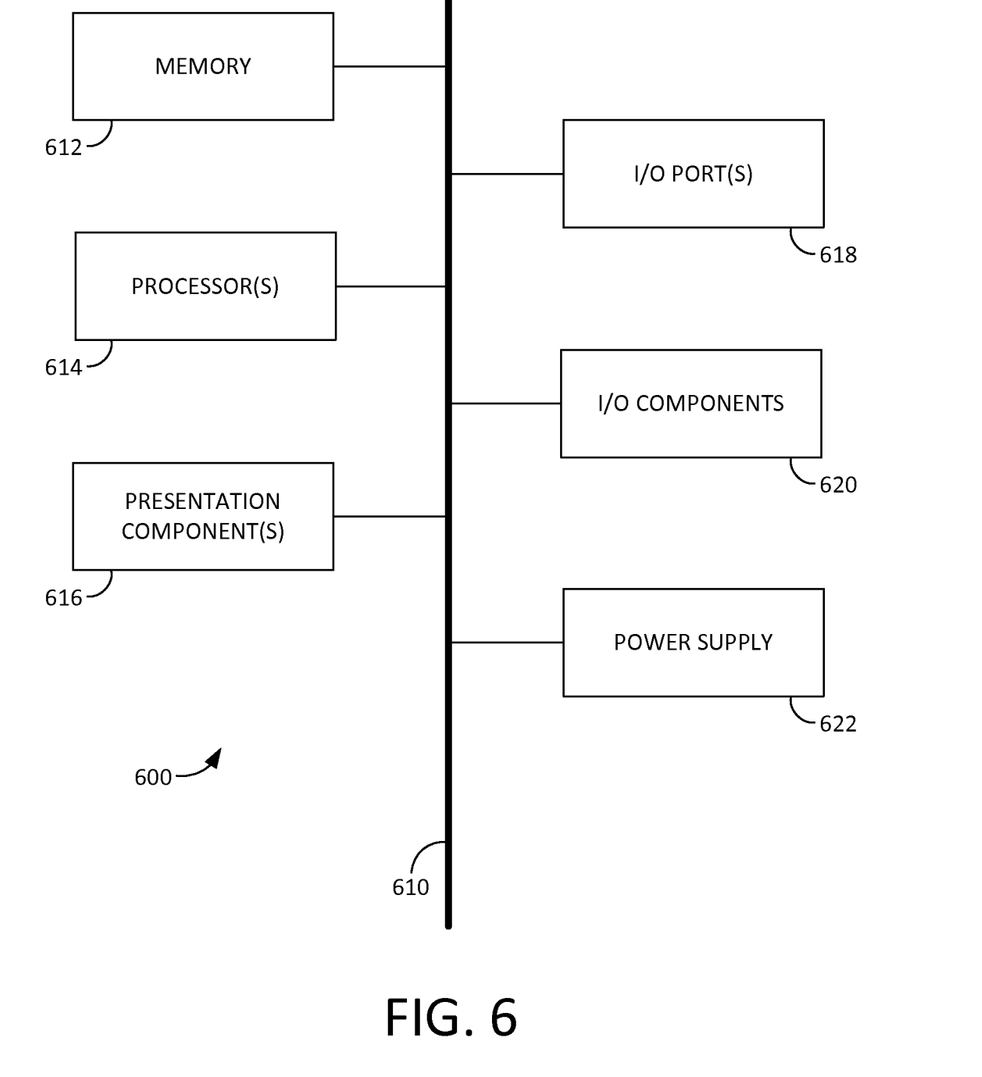
FIG. 6 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 6, an illustrative operating environment, or computing platform, for implementing embodiments of the present invention is shown and designated generally as computing device 600. Computing device 600 is but one example of a suitable computing environment and is not intended to suggest any limitation as to the scope of use or functionality of the embodiments of the present invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although depicted in FIG. 6, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 616 while also being one of the I/O components 620. As another example, processors have memory integrated therewith in the form of cache; however, there is no overlap between the one or more processors 614 and the memory 612. A person having of skill in the art will readily recognize that such is the nature of the art, and it is reiterated that the diagram of FIG. 6 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 600 of FIG. 6 and any other reference to "computing device," unless the context clearly indicates otherwise.

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 600 includes one or more processors 614 that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a keyboard, mouse, stylus, a drawing tablet, a microphone, joystick, game pad, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to one or more software modules or applications that may cause the display of the computing device 600 to render immersive augmented reality or virtual reality.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media, having executable code embodied thereon, wherein the code, when executed by one or more processors of a computing system, enables the computing system to:

provide a test library to a testing environment utilized to perform automated testing of a software application in accordance with test code, the testing environment to perform automated testing of core functionality encoded in a first programming language, and the test library extending the testing capabilities of the testing environment to perform automated testing of shell scripts, which are encoded in a second programming language and invoke one or more executable modules external to the software application, by communicating with an interpreter that is to execute the second programming language and generate test versions of the one or more executable modules in accordance with the test code; and automatically test the core functionality and the shell scripts of the software application under test, utilizing the testing environment with the test library, in accordance with the test code, wherein the test code defines execution parameters for execution of the core functionality and the shell scripts of the software application under test and validation parameters for the validation of results of the execution of the core functionality of the software application under test.

2. The one or more computer-readable media of claim 1, wherein to automatically test the core functionality and the shell scripts the instructions, when executed by the one or more processors, enable the computing system to:

cause the core functionality and the shell scripts to be executed in accordance with the execution parameters of the test code;

validate actual results of the execution of the core functionality and the shell scripts against expected results in accordance with the validation parameters of the test code; and cause the validation to be output to a user of the computing system to enable analysis of the correctness of the core functionality and the shell scripts by the user.

3. The one or more computer-readable media of claim 1, wherein the one or more executable modules are located at a first path and to generate the test versions of the one or more executable modules is to generate the test versions of the one or more executable modules to a second path that is different from the first path, and wherein the test library further extends the testing capabilities of the testing environment to enable the computing system to change a search path of the software application from the first path to the second path.

4. The one or more computer-readable media of claim 1, wherein to generate test versions of the one or more executable modules includes generation of a test version of one of the one or more executable modules that logs arguments passed to the test version by the test code.

5. The one or more computer-readable media of claim 4, wherein the test version of the one of the one or more executable modules is further to invoke a test version of another of the one or more executable modules that is identified in the arguments.

6. The one or more computer-readable media of claim 4, wherein the test version of the one of the one or more executable modules is further to: invoke the one of the one or more executable modules.

7. The one or more computer-readable media of claim 6, wherein the test version of the one or more executable modules is further to log actual output of the one of the one or more executable modules for validation of the actual output against expected output.

8. The one or more computer-readable media of claim 3, wherein the test version of the one of the one or more executable modules is further to log environmental variables of the computing system.

9. The one or more computer-readable media of claim 1, wherein the test code is written in the first programming language.

10. A computer-implemented method for automated testing of a software application comprising:

providing a test library to a testing environment utilized to perform automated testing of a software application in accordance with test code, the testing environment to perform automated testing of core functionality encoded in a first programming language, and the test library extending the testing capabilities of the testing environment to perform automated testing of shell scripts, which are encoded in a second programming language and invoke one or more executable modules external to the software application, by communicating with an interpreter that is to execute the second programming language and generate test versions of the one or more executable modules in accordance with the test code; and automatically testing the core functionality and the shell scripts of the software application under test, utilizing the testing environment with the test library, in accordance with the test code, wherein the test code defines execution parameters for execution of the core functionality and the shell scripts of the software application under test and validation parameters for the validation of results of the execution of the core functionality of the software application under test.

11. The method of claim 10, wherein generating test versions of the one or more executable modules includes generating a test version of one of the one or more executable modules that logs parameters passed to the test version by the test code.

12. The method of claim 11, wherein the test version of the one of the one or more executable modules is further to invoke execution of a test version of another of the one or more executable modules that is identified in the parameters.

13. The method of claim 11, wherein the test version of the one of the one or more executable modules is further to:

invoke the one of the one or more executable modules; and log any output of the one of the one or more executable modules.

14. The method of claim 11, wherein the test version of the one of the one or more executable modules is further to log environmental variables of the computing system during execution of the test versions of the one or more executable modules.

15. A computing system for testing software applications comprising:

one or more processors; and a memory, coupled with the one or more processors, having executable code embodied thereon, wherein the executable code, when executed by the one or more processors, provide the computing system with a testing environment that enables automated testing of core functionality and shell scripts within a software application under test by enabling the computing system to:

generate, in accordance with test code, test versions of one or more executable modules that are to be invoked by the shell scripts;

cause the core functionality and the shell scripts to be executed by the one or more processors in accordance with the test code, the core functionality associated with a first programming language and the shell scripts associated with a second programming language, wherein at least one or more instructions contained in the shell scripts are to invoke the one or more executable modules to cause the one or more executable modules to be executed;

cause the shell scripts to invoke the execution of the test versions of the one or more executable modules in place of the one or more executable modules;

validate actual results of the execution of the shell scripts and the core functionality against expected results of the execution; and cause the validation to be output to a user of the computing system to enable analysis of the correctness of the core functionality and the shell scripts by the user.

16. The computing system of claim 15, wherein to generate test versions of the one or more executable modules includes generation of a test version of one of the one or more executable modules that logs parameters passed to the test version by the test code.

17. The computing system of claim 15, wherein the test version of the one of the one or more executable modules is further to invoke a test version of another of the one or more executable modules that is identified in the parameters.

18. The computing system of claim 15, wherein the test version of the one of the one or more executable modules is further to:

invoke the one of the one or more executable modules; and log any output of the one of the one or more executable modules.

* * * * *